United States Patent [19]

Deneka et al.

[11] Patent Number: 4,792,347
[45] Date of Patent: Dec. 20, 1988

[54] METHOD FOR COATING OPTICAL WAVEGUIDE FIBER

[75] Inventors: Charles W. Deneka; Gitimoy Kar, both of Painted Post, N.Y.; Thomas O. Mensah, Norcross, Ga.

[73] Assignee: Corning Glass Works, Corning, N.Y.

[21] Appl. No.: 911,479

[22] Filed: Sep. 25, 1986

[51] Int. Cl.$^4$ .................... C03C 25/02; C03B 25/00; B05D 5/06
[52] U.S. Cl. ...................... 65/3.11; 65/3.4; 65/12; 427/163
[58] Field of Search ............... 65/3.1, 3.11, 3.4, 12, 65/13, 18.2, 32, 60.3, 900; 427/163

[56] References Cited

U.S. PATENT DOCUMENTS

| | | | |
|---|---|---|---|
| 4,040,807 | 8/1977 | Midwinter | 65/3.1 |
| 4,396,409 | 8/1983 | Bailey et al. | 65/13 |
| 4,473,599 | 9/1984 | Elion | 65/3.11 |
| 4,531,959 | 7/1986 | Kar et al. | 65/3.11 |
| 4,600,442 | 7/1986 | Pastor et al. | 65/900 |
| 4,608,276 | 8/1986 | Lamb et al. | 65/3.11 |
| 4,613,521 | 9/1986 | Smith, Jr. | 65/12 |
| 4,664,689 | 5/1987 | Davis | 65/3.11 |
| 4,673,427 | 6/1987 | Giessen et al. | 65/13 |

FOREIGN PATENT DOCUMENTS

| | | | |
|---|---|---|---|
| 58-90601 | 5/1983 | Japan | 65/12 |
| 58-181738 | 10/1983 | Japan | 65/900 |
| 2105618 | 3/1983 | United Kingdom . | |
| 2113574 | 8/1983 | United Kingdom . | |

OTHER PUBLICATIONS

C. M. G. Jochem et al., "Method for Cooling and Bubble-Free Coating of Optical Fibers at High Drawing Rates", *Electronic Letters*, 21 (18), 786–787 (Aug. 1985).
C. M. G. Jochem et al., "High-Spped Bubble-Free Coating of Optical Fibers on a Short Drawing Tower", *Proc. IOOC-ECOC* '85 (Venice, Italy, Oct. 1-4, 1985), pp. 515–518.
C. M. G. Jochem et al., "Cooling and Bubble-Free Coating of Optical Fibers at a High Drawing Rate", *J. Lightwave Tech.*, vol. LT-4, No. 7, 739–742 (Jul. 1986).

*Primary Examiner*—David L. Lacey
*Assistant Examiner*—Michael K. Boyer
*Attorney, Agent, or Firm*—Kees van der Sterre

[57] ABSTRACT

In the process for applying a protective plastic coating to a glass optical waveguide fiber by the application of a curable liquid coating material thereto and the subsequent curing of the liquid coating to a protective plastic layer, the surface of the glass optical fiber is conditioned prior to the application of the liquid coating material thereto by replacing air adjacent the fiber surface with a selected gas preferably exhibiting high solubility in the liquid coating composition and resisting bubble formation in the liquid coating layer as it is formed.

1 Claim, 2 Drawing Sheets

METHOD FOR COATING OPTICAL WAVEGUIDE FIBER

BACKGROUND OF THE INVENTION

A. Field of the Invention

The present invention relates to the coating of optical waveguide fibers with liquid-applied organic materials which are thereafter cured to form solid protective organic coatings on the fibers. More particularly, the invention relates to an improved method, and apparatus for carrying out the method, wherein the surface of the optical waveguide fiber is conditioned prior to the application of the liquid-applied organic coating material in order to improve the qualities of the glass/organic coating interface and thus the properties of the protective coating as cured.

B. Description of the Prior Art

The application of liquid-applied organic coatings to optical waveguide fibers for the purpose of protecting the fibers from damage is well known. Glass fibers including glass optical fibers are quite strong as first drawn from a heated glass preform or glass melt, exhibiting very high strength so long as the surfaces of the drawn fiber remain defect-free. However, the processing of glass optical fibers for the purpose of cabling and installation thereof for applications such as optical telecommunications requires handling of the fibers, and results in a substantial weakening thereof unless the fibers are protected from surface damage.

In order to preserve the inherent strength of glass optical fibers as drawn, protective coatings consisting most typically of thermoplastics or liquid applied curable plastic resins have conventionally been applied to the fibers immediately after they are drawn and prior to contact between the fiber and any other surface. With recent advances in manufacturing technology, optical fibers are being drawn at ever increasing speeds, and apparatus for applying protective plastic coatings thereto has therefore been under continual development to provide dependable coating performance at the higher draw speeds being employed. Problems attending the use of high draw speeds include the appearance of uncoated surface areas or skips on the fiber surface, the application of the coatings in a non-concentric fashion, and the application of coatings incorporating bubble defects or other inhomogeneities. Refinements in coating application systems currently under development have as their objective the avoidance of these various coating defects.

One successful approach to the problem of fiber coating at high coating rates has been that of pressure coating. This process involves applying the organic coating material as a viscous liquid to the surface of the optical fiber under high pressure conditions wherein the coating liquid is force-fed to the fiber surface.

Methods and apparatus for pressure-applying organic coating materials to an optical fiber being drawn through the apparatus are described in U.S. Pat. No. 4,264,649. In accordance with the method of that patent, concentricity of the fiber within the coating and avoidance of skips or bubbles in the coating layer are attained utilizing pressure feeding of the coating material into a specially designed reservoir incorporating a tapered fiber guide cone and a tapered sizing orifice, the guide cone and orifice together forming a conical channel for directing the coating material toward the fiber surface.

Particular attention has been directed to the avoidance of bubble inclusions in organic coatings applied to optical fibers at high drawing speeds. These bubbles are generally considered to arise due to the entrainment of air carried with the surface of the optical fiber into the coating reservoir, due to the high draw speeds employed. Published patent specification GB No. 2 105 618 A describes apparatus designed to reduce bubble incorporation in the coating by employing a partial vacuum in a chamber located above the surface of the liquid in the coating reservoir. The partial vacuum is generated by means of an air induction device which reduces pressure in the air atmosphere surrounding the optical fiber at the point where it enters the surface of the coating liquid in the reservoir.

A different approach to the problem of air entrainment in the coating layer involves stripping entrained air or bubbles from the surface of the fiber after the fiber has entered the coating liquid. Published patent specification GB No. 2 113 574 A describes an optical fiber coating reservoir comprising upper and lower chambers containing coating material and wherein the lower chamber is maintained at elevated pressure. This results in a flow of the coating material upwardly into the upper reservoir, forming a countercurrent which sweeps bubbles from the surface of the optical fiber prior to the exit thereof from the coating system.

Inherent in the normal operation of coating dies of the above-described types is a condition wherein a downwardly drawn meniscus is formed in the surface of the coating material at the point of entry of the optical fiber into the coating liquid. This phenomenon is more particularly described in GB No. 2 113 574 A noted above.

While the foregoing systems have been effective to reduce coating skips or bubble formation in the liquid applied coatings, further improvements in the quality of the fiber/coating interface as well as further reductions in the number of bubbles entrained in the coating layer are needed. For example, if the coating/fiber interface is not characterized by good bonding of the coating material to the glass surface of the fiber, delamination of the coating from the fiber can occur. Most delamination is thought to occur in the course of temperature cycling which can be experienced during cabling or after installation of the cables in a telecommunications system. Of course, the complete elimination of bubbles from the organic coating, which bubbles can cause optical loss from the optical fiber due to microbending effects, would also be desirable.

Therefore, it is a principal object of the present invention to provide a method for improving the characteristics of the interface between glass optical fibers and liquid-applied organic coatings thereon.

It is a further object of the invention to improve the uniformity and reduce the formation of entrained bubbles in organic coatings applied by the application of liquid organic coating materials to optical fibers during fiber drawing.

It is a further object of the invention to provide apparatus for the application of liquid-applied coating materials to optical fibers which improves the fiber-coating interface and the uniformity of the applied coating.

Other objects and advantages of the invention will become apparent from the following description thereof.

SUMMARY OF THE INVENTION

The present invention provides a method for coating an optical fiber which aids in preventing bubble formation in the coating and also avoids coating instabilities which would effect the concentricity and the quality of the applied coating. Briefly, the method of the invention provides a fiber surface conditioning system positioned upstream of and preferably at the inlet to the fiber coating die. The fiber coating die may be of conventional type. The fiber surface conditioning system, however, acts to modify the surface of the glass fiber entering the fiber coating die so that the coating characteristics of the fiber in the liquid coating composition are improved.

The method of the invention generally involves providing an enclosed space above the coating liquid wherein a controlled atmosphere effective to condition the surface of the optical fiber prior to coating is provided. A characteristic feature of the method is that air is transported away from the fiber surface, being replaced by a stream of a gas preferably exhibiting high solubility in the liquid coating composition or high diffusibility through the coating material. Optionally, vapors of a glass conditioning or coupling agent are provided in the air-displacing gas stream, such agent being capable of improving glass surface compatibility with the liquid organic coating material, yet not reacting harmfully with the material during coating deposition so as to adversely affect the curing characteristics or cured properties of the coating. In this way, air and/or other harmful constituents which would otherwise be entrained in the coating layer are eliminated, instabilities in the coating process are minimized, and a high-quality coating interface exhibiting at least a reduced number of coating bubbles may be provided.

Referring more specifically to the process of the invention in the context of the prior art, the invention is characterized as an improvement in the conventional process for applying a protective organic coating material to a glass optical fiber wherein the optical fiber as drawn from a glass preform is directly transported to liquid coating die. In the standard process, the organic coating material is simply applied as a liquid to the optical fiber surface, and the liquid coating material on the fiber exiting the die is thereafter cured to form a solid protective coating. In accordance with the invention, prior to entering the coating die, the fiber is transported through a fiber conditioning zone wherein the surface of the fiber is swept with a flowing atmosphere consisting essentially of a gas or gas mixture exhibiting good solubility or diffusibility in the coating liquid. The sweeping process displaces air from the surface of the fiber; therefore the only gas present on the fiber surface at the point of entry into the liquid coating is the coating-soluble gas, plus any fiber surface conditioning materials present therein.

Conventional coating apparatus for the application of protective organic coating materials to glass optical fibers essentially comprises a coating die for applying a uniform layer of the organic coating material as a liquid film on the surface of the fiber for subsequent curing. The coating die generally comprises a liquid coating reservoir containing a replenishable charge of the coating liquid, with this charge presenting an entrance surface through which the freshly drawn glass optical fiber enters the coating liquid. The die also generally includes an exit orifice positioned downstream of the reservoir in the direction of fiber transport through the die for removing excess coating material from the fiber surface prior to fiber exit from the die body.

In accordance with the invention, the fiber apparatus further comprises fiber conditioning means positioned upstream of the coating die and adjacent the entrance surface to the coating material, said conditioning means being adapted to treat the surface of the fiber, prior to transport thereof into the coating liquid, with a flowing atmosphere consisting essentially of a gas exhibiting high solubility or diffusibility in the coating material. Typically, the fiber conditioning means comprises a controlled atmosphere chamber into which the flowing atmosphere is introduced, the chamber being adapted to provide efficient transport of the flowing atmosphere across the surface of the entering fiber in order to displace any air being carried into the chamber by the fiber from the fiber surface.

DESCRIPTION OF THE DRAWING

The invention may be further understood by reference to the drawing wherein.

DETAILED DESCRIPTION

Figure 1:
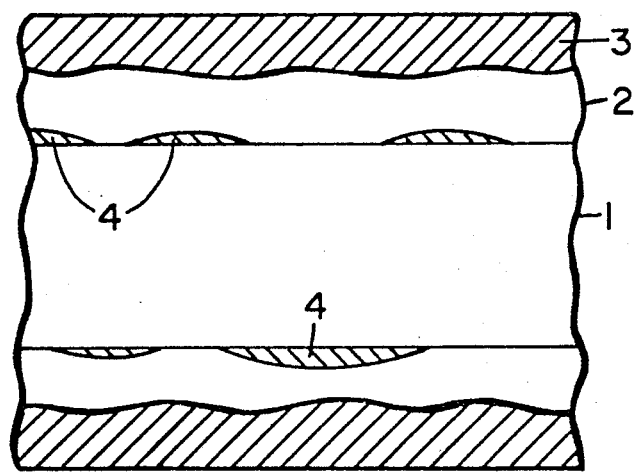
FIG. 1 schematically illustrates a coating delamination effect which can occur in optical fibers coated in accordance with the prior art.

Improvements in the optical fiber coating process in accordance with the invention are intended to provide both short term and long term improvements in fiber performance. In the short term, improvements are sought in the quality of the coating applied to the fiber, particularly better coating uniformity and coating quality. Most desirably, the incorporation of bubbles or other coating defects affecting fiber performance or the protective qualities of the coating is reduced or avoided.

From the long term standpoint, optical fibers are naturally expected to perform efficiently in optical cable installations regardless of extreme environmental effects which may be encountered. Obviously, substantial increases in signal attenuation or reductions in signal bandwidth in the course of climatic changes typically encountered at the cable installation are not acceptable.

Currently, environmental testing in the laboratory is used to screen optical cable designs in order to insure that targeted optical characteristics and good mechanical performance will be retained in the installed cable. In the course of these tests, optical cables are typically subjected to temperature extremes substantially exceeding those likely to be encountered naturally.

Another factor possibly influencing coating performance is that the coated fibers themselves are typically subjected to temperatures in excess of 80° C. in the course of the fiber cabling operation. This exposure alone can develop certain types of defects in the coating-fiber interface not detectable prior to thermal cycling.

Optical fibers coated in accordance with conventional coating processes have in some cases exhibited significant optical attenuation shifts during thermal cycling in the course of environmental optical cable tests. These shifts are manifested as increases in optical loss at 1300 nm and 1500 nm in the cables which losses intensified as thermal cycling progressed.

One suspected cause of these attenuation upsets was incompatibility between the optical fiber surface and the protective plastic coating. Another factor considered was a possible chemical interaction between the coating and the various gel materials commonly used to support optical fibers in so-called loose tube cable designs. In those designs, gels containing low molecular weight oil components are commonly used as fillers, and these oils could perhaps migrate into the plastic coating material under the temperature extremes encountered in environmental testing or in actual use. Such penetation could possibly result in the development of stresses in the applied coating which might distort the fiber and result in microbending losses.

Where a fiber coating is applied nonuniformly or includes defects such as coating bubbles, one would expect that penetration of such gel constituents into the coating could occur non-uniformly, resulting in nonuniform stresses in the coating and accentuating the microbending attenuation observed in such fibers.

In fact some evidence had been developed that, utilizing prior art techniques for the application of the liquid applied coating to the fiber surface, coatings which are subject to delamination from the fiber in the presence of low molecular weight gel constituents can be produced.

FIG. 1 of the drawing consists of a schematic illustration in cross section of a section of a coated optical fiber exhibiting delamination of the kind described.

Referring more particularly to FIG. 1, fiber 1 comprises a coating 2 which is typically applied in two stages by conventional processing. Hatched region 3 in FIG. 1 corresponds to a modified coating surface which results when species from the support medium in contact with the coated fiber in an optical cable diffuse into the protective coating on the fiber. Delaminated regions 4 have been observed in optical fibers present in such cables after thermal cycling tests, and are quite possibly attributable to poor coating quality or adherence at the glass/coating interface which can occur in the conventional coating processes used to manufacture these fibers.

The presence of bubbles in the coating layer FIG. 1 is not shown. However it is known that such bubbles can form during the coating process, and it would be expected that these would accentuate any coating delamination which might be initiated in optical cables in actual use. Additionally such bubbles are known to cause microbending loss in coated fibers due to the coating stresses which arise in the vicinity of such bubbles in applied fiber coatings.

The mechanisms by which delamination of protective coatings from the glass surface of the optical fiber are not fully understood. However one possible mechanism which could accelerate such delamination would be poor curing of the liquid-applied organic coating after application of the liquid to the fiber surface. This could occur, for example, if excess oxygen were retained at the fiber surface or in a bubble adjacent thereto, since it has been postulated that oxygen can inhibit the effectiveness of curing processes such as the ultraviolet radiation curing techniques presently employed for the commercial application of these protective coatings.

The present invention provides a process for avoiding many of the aforementioned difficulties, since the surface of the fiber is conditioned by removing air therefrom prior to coating. The air is replaced by sweeping the fiber with a flowing gas exhibiting better compatibility with the coating. This avoids any possible curing inhibition effects which may be occuring. Preferably, a gas is selected for this purpose which also exhibits good solubility or diffusibility in the liquid coating material. This would be expected to reduce the incidence of gas bubbles in the applied coating, thereby further reducing microbending loss in the coated fiber notwithstanding the presence or absence of coating delamination therein.

Among the soluble gases which may be used to condition the surface of an optical fiber to be coated are gases such as nitrogen, carbon dioxide, and the Group VIII or so-called noble gases, e.g., xenon, neon, argon or the like. Chemically inert halocarbon gases or vapors thereof, such as chloroform, Freon ® halocarbons, or other chlorine- or fluorine-substituted hydrocarbons may also be considered. A particularly preferred inert gas from the standpoint of bubble suppression in the applied coating is carbon dioxide.

The surface characteristics of the optical fiber may also be advantageously modified by the introduction with the purge gas of vapors of chemical species which improve glass surface compatibility with liquid coating materials. Examples of such species include conventional silane coupling agents; alternative surface treating agents might include monomers or additives already present in the liquid coating prepolymer.

The diffusion characteristics of the inert atmosphere are considered to be important since it would be desirable if gases unavoidably entrained in the coating liquid during the coating process could ultimately diffuse out of the cured coating. This would reduce the possibility that gas accumulations could develop in the coating during the coating process or during temperature cycling in the course of fiber cabling or in later use.

Figure 2:
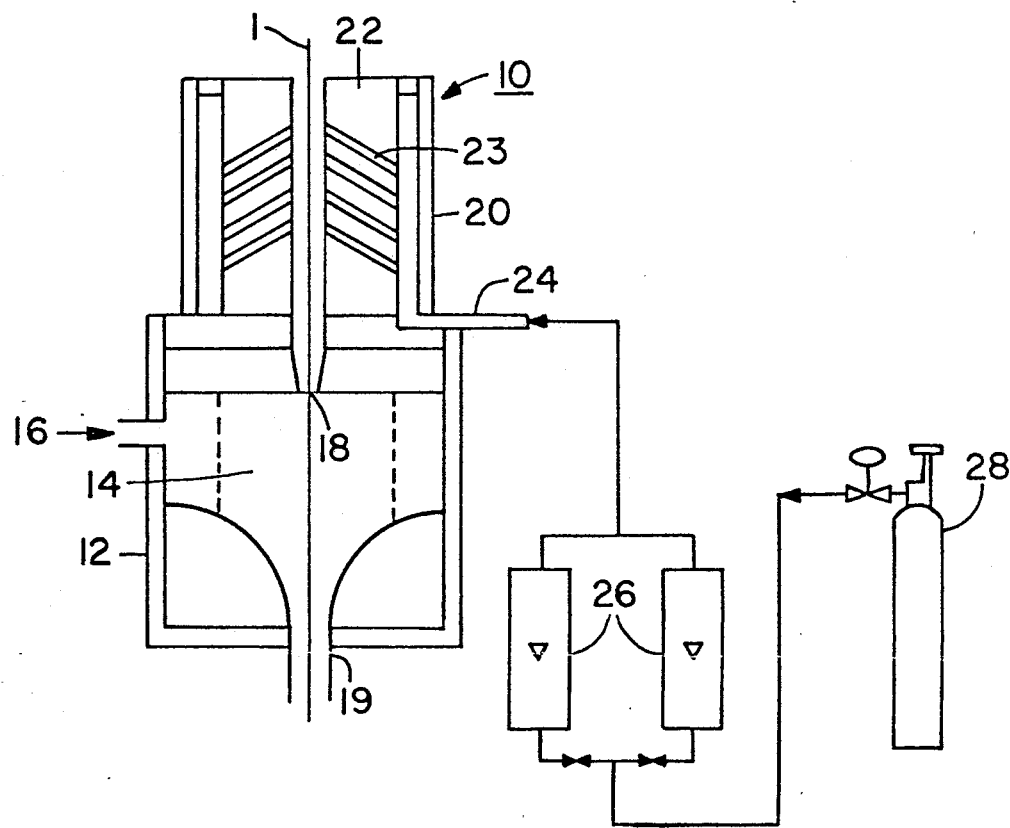
FIG. 2 schematically illustrates optical fiber coating apparatus provided with fiber conditioning means in accordance with the invention.

Apparatus suitable for conditioning the surface of optical fibers prior to coating must efficiently displace air entrained with the moving fiber in order to prevent air entry into the coating liquid. A system suitable for accomplishing this result is schematically illustrated in FIG. 2 of the drawing. FIG. 2 illustrates, in partial cross section but not to scale, optical fiber coating apparatus comprising fiber surface conditioning means in accordance with the invention. The apparatus, generally indicated by numeral 10 in the drawing, comprises a liquid coating die 12 of the conventional design which includes a liquid coating reservoir 14 containing a replenishable charge of coating liquid which is introduced to the die through port 16. The upper surface of this coating liquid is shown at 18 and comprises the entrance surface through which the fiber to be coated passes upon entering the die.

The coating die further includes an exit orifice 19 positioned downstream of the reservoir of coating material through which the fiber is transported out of the die. Orifice 19 is effective to remove excess coating material from the fiber surface prior to its exit from the coater.

The apparatus further comprises fiber conditioning unit 20 positioned atop the coating die, i.e., upstream of the die with respect to the direction of fiber transport through the unit. This conditioning unit is directly adjacent the entrance surface of the liquid coating material, and can directly control the atmosphere above that surface. The conditioning unit comprises a flow director 22 which includes a multiplicity of gas flow channels 23 through which gas is introduced to provide a contrlled flow of a selected gas against the surface of the moving fiber to efficiently sweep entrained air therefrom. The selected gas is introduced into the conditioning unit through port 24 which is connected through flow meters 26 to a gas source or cylinder 28.

Figure 3:
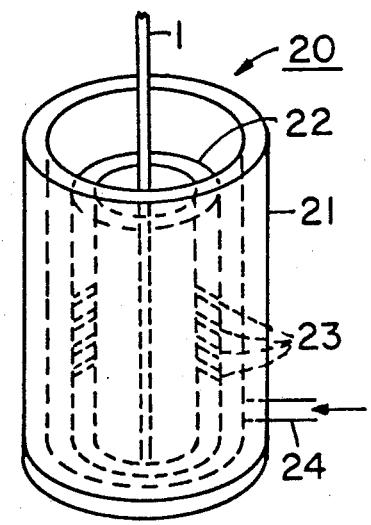
FIG. 3 schematically illustrates a treating atmosphere flow controller useful in the apparatus of FIG. 2 for conditioning the surface of an optical fiber in accordance with the invention.

The design of the conditioning unit, also called a sweep or purge unit by virtue of its function to sweep or purge air from the surface of an incoming fiber, is illustrated in more detail in FIG. 3 of the drawing. The unit comprises an outer sleeve or casing 21 which acts as an enclosure for the unit to control the atmosphere therewithin, and through which the selected gas for the purge atmosphere is introduced via incoming port 24.

Positioned within outer sleeve 21 is inner cylindrical sleeve 22 which is a flow director provided with gas flow channels 23 extending from the outer cylindrical surface to the inner surface thereof. These channels 23 are shown as upwardly directed channels which are effective to provide countercurrent gas flow with respect to the downward direction of fiber transport through the unit, although such flow is not always required.

The selected flowing atmosphere for conditioning the fiber surface is introduced into the sweep unit through port 24 and is distributed about the annular chamber formed by outer sleeve 21 and inner sleeve 22 to provide uniform gas pressure in that chamber. This gas then flows through flow control channels 23 into the central cylindrical channel through which the optical fiber is drawn, forming a strong upward current of the selected gas through that channel and out of the unit as shown by the arrows within sleeve 22.

An air-entraining optical fiber 1 introduced into the sweep unit from above and transported downwardly therethrough as shown is efficiently swept with the gases flowing upwardly through channels 23. This flow removes any debris present on the fiber and effectively displaces air adjacent the fiber surface before the fiber exits the sweep unit and enters the upper surface of the coating liquid.

A number of sample runs were conducted under various conditions of gas flow and fiber draw speed to determine the effects of fiber conditioning on factors such as coating cure characteristics, fiber attenuation, and the bubble count in the applied protective coatings. These fiber draws were conducted with both single mode and multimode optical fiber, utilizing apparatus such as schematically illustrated in FIGS. 2 and 3 of the drawing. In all cases, a uv-curable liquid acrylate coating composition was used to coat the fibers. Such liquid coating formulations are widely used and commercially available.

The following Table reports the results of a number of such fiber draws, using nitrogen and other gases and gas mixtures as purge gases. Included in the Table for each of a number of sample optical fibers are the draw speed at which the fiber was transported through the conditioner-coater apparatus, in meters per second, the composition and flow rate of the selected conditioning gas into the sweep unit, in liters per minute, and the identification of optional additive fiber conditioning vapors present in the conditioning gas, if any. Also reported are the bubble count observed in the applied coating, expressed as the number of bubbles observed by microscopic examination of a 100 μm length of fiber, and the attenuation of the coated fiber at 1300 nm wavelength, in decibels per kilometer.

The additives present in the purge gas during some of the reported draws (in this case silane coupling agents), were introduced by bubbling the purge gas through solutions of the silanes in an acetone solvent prior to transport to the coating unit. The identity of the silane and concentration of the acetone solution are reported in the Table. For the 100% silane examples reported, no acetone solvent was used. The silanes identified are commercially obtainable from Dow Corning Corporation, Midland, Mich.

TABLE

| Sample No. | Fiber Draw Speed (m/s) | Inert Gas Flow (L/m) | Additive | Bubble Count | Fiber Attenuation (1300 nm) (db/km) |
|---|---|---|---|---|---|
| 1 | 3.0 | none | none | 5 | 0.42 |
| 2 | 5.5 | none | none | 6 | 0.40 |
| 3 | 5.5 | none | none | 4 | 1.83 |
| 4 | 5.5 | none | none | 6 | 0.88 |
| 5 | 3.0 | 3.0($N_2$) | none | 5 | 0.35 |
| 6 | 5.5 | 3.0 | none | 6 | — |
| 7 | 5.5 | 3.0 | none | 6 | 0.35 |
| 8 | 5.5 | 3.0 | none | 8 | 0.26 |
| 9 | 3.0 | 7.0($N_2$) | none | 5 | 0.36 |
| 10 | 5.5 | 7.0 | none | 8 | 0.32/0.43 |
| 11 | 5.5 | 7.0 | none | 8 | 0.38 |
| 12 | 5.5 | 7.0 | none | 18 | 0.39 |
| 13 | 3.0 | 12.0($N_2$) | none | 4 | 0.36 |
| 14 | 5.5 | 12.0 | none | — | 0.42 |
| 15 | 5.5 | 12.0 | none | 8 | — |
| 16 | 5.5 | 12.0 | none | 5 | 0.43 |
| 17 | 5.5 | 18.0 | none | 8 | 0.45 |
| 18 | 5.5 | 3.0($N_2$) | 0.1% Z-6079 | 6 | 0.48 |
| 19 | 5.5 | 3.0 | 0.1% Z-6020 | 4 | 0.52 |
| 20 | 5.5 | 3.0 | 1.0% Z-6079 | 6 | Upset 18.5 |
| 21 | 5.5 | 3.0 | 10.0% Z-6079 | 9 | 0.33 |
| 22 | 5.5 | 7.0($N_2$) | 0.1% Z-6079 | 5 | 0.29 |
| 23 | 5.5 | 7.0 | 0.1% Z-6020 | 4 | 0.67 |
| 24 | 5.5 | 7.0 | 1.0% Z-6079 | 5 | 0.35 |
| 25 | 5.5 | 7.0 | 10.0% Z-6079 | 9 | 0.46 |
| 26 | 5.5 | 7.0 | 100.0% Z-6079 | 2 | 0.70 |
| 27 | 5.5 | 12.0($N_2$) | 0.1% Z-6079 | 5 | 0.28 |
| 28 | 5.5 | 12.0 | 0.1% Z-6020 | 5 | 0.56 |
| 29 | 3.0 | 12.0 | 0.1% Z-6079 | 4 | 0.31 |
| 30 | 5.5 | 12.0 | 10.0% Z-6079 | 12 | 0.39 |
| 31 | 5.5 | 12.0 | 100.0% Z-6079 | 3 | 0.69 |
| 32 | 5.5 | 13.5($CO_2$) | none | 3 | 0.32 |
| 33 | 5.5 | 3.0 (Freon$^{-12}$) | none | 0 | 0.32 |

Experiments conducted with nitrogen gas as the primary surface conditioning gas, either alone or with added agents such as silanes, indicated no adverse effects on fiber attenuation or coating quality with increasing gas flow up to at least 12 L/m. Evidence suggested that a long-term improvement in the fiber/coating interface, manifested by an enhancement in the stability of the cabled fiber against attenuation increases in thermal cycling when subjected to laboratory environmental testing, had been obtained.

From the standpoint of bubble reduction, nitrogen alone as a purge gas did not appear effective to reduce bubble count in the fiber coating at any of the flow rates or fiber drawing speeds employed. However, bubble reduction was observed when nitrogen containing a relatively high proportion of a silane surface conditioning additive was used.

Figure 4:
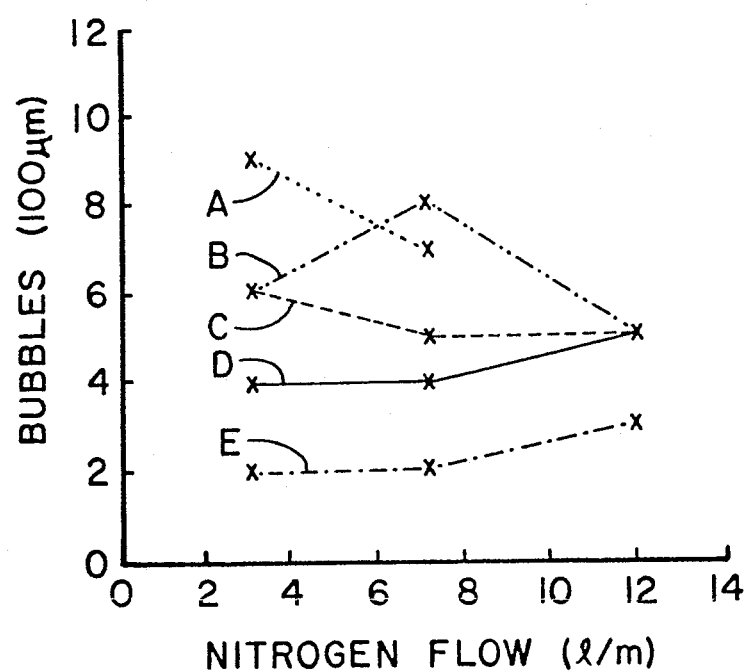
FIG. 4 is a graph plotting coating bubble content against conditionng atmosphere flow rate for some nitrogen-containing gases.

FIG. 4 of the drawing is a graph plotting coating bubble count as a function of purge gas flow for a number of specified nitrogen-based purge gases comprising added silane vapors. In FIG. 4, Curve A is for Z-6020(100%), Curve B is for $N_2$, Curve C is for Z-6079(0.1%), Curve D is for Z-6020(0.1%) and Curve E is for Z-6079(100%). All of the fibers treated as reported in FIG. 4 were drawn at 5 meters/second, with nitrogen purge gas flows ranging from 3-12 liters/minute. Measured bubble counts ranged from 2 to 8 bubbles per 100 microns of coated fiber length depending on the nature and amount of silane introduced. As the Figure indicates, best results in terms of bubble reduction were obtained with a purge gas consisting of nitrogen bubbled through undiluted Z-6079 silane coupling agent.

Other gases which can be used as alternative purge gases in the apparatus of FIG. 3 to achieve bubble reduction in the cured coating include carbon dioxide, xenon, and halocarbon gases such as Freon gases, e.g. Freon-12 ($CCl_2F_2$). As the data in the Table suggests, Freon-12 reduced the bubble count essentially to zero, while $CO_2$ reduced it to a very low level. Additional data suggests that coatings which are essentially bubble-free can be produced with $CO_2$ as well as with the Freon gases. Additionally, with either of these purge gases, the pressure at which the coating is applied to the optical fiber surface can be advantageously reduced without increasing the rate of bubble formation.

The use of carbon dioxide in the method and apparatus of the invention is particularly advantageous because of its low cost, and because no requirement for special handling of the conditioning unit exhaust is required. Thus the use of a carbon dioxide sweeping gas in conjunction with a conditioning unit such as shown in FIGS. 2 and 3 of the drawing is a particularly preferred embodiment of the present invention.

We claim:

1. In a method for applying a protective organic coating to a glass optical fiber wherein the glass fiber as drawn from a glass preform is transported through a liquid coating die having a fiber inlet, a fiber outlet, and a liquid reservoir containing an organic coating liquid, the liquid coating die providing a liquid coating on the fiber, wherein the liquid coating is thereafter cured to provide the protective organic coating, wherein the coating die is operated under a condition such that a downwardly drawn meniscus is formed in the surface of the coating material at the point of entry of the optical fiber into the coating liquid, and wherein bubble inclusions in the coating are reduced by reducing air entrainment into the coating liquid by the fiber, the improvement wherein:

(a) the step of reducing air entrainment into the coating liquid comprises the step of passing the fiber through a fiber conditioning chamber positioned adjacent to and connected with the fiber inlet to the liquid reservoir, the chamber comprising a cylindrical channel through which the fiber is downwardly drawn into the reservoir, the chamber further comprising a gas inlet into which a purge gas in introduced, said gas being caused to flow upwardly in the cylindrical channel to provide countercurrent gas flow with respect to the downward direction of fiber draw; and (b) the purge gas is carbon dioxide.

* * * * *